(12) United States Patent
Kang et al.

(10) Patent No.: US 11,203,175 B2
(45) Date of Patent: Dec. 21, 2021

(54) BONDING DEVICE AND METHOD OF BONDING DISPLAY DEVICE USING THE SAME

(71) Applicant: Samsung Display Co., Ltd., Yongin-Si (KR)

(72) Inventors: Sukju Kang, Suwon-si (KR); Byung-moo Kim, Suwon-si (KR); Geunyoung Yu, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 252 days.

(21) Appl. No.: 16/502,259

(22) Filed: Jul. 3, 2019

(65) Prior Publication Data
US 2020/0009803 A1    Jan. 9, 2020

(30) Foreign Application Priority Data
Jul. 6, 2018    (KR) .......................... 10-2018-0078995

(51) Int. Cl.
*B32B 3/00* (2006.01)
*B32B 27/00* (2006.01)
(Continued)

(52) U.S. Cl.
CPC ................ *B32B 3/04* (2013.01); *B29C 65/48* (2013.01); *B29C 65/70* (2013.01);
(Continued)

(58) Field of Classification Search
CPC .. B32B 3/00; B32B 3/04; B32B 27/00; B32B 27/08; B29C 65/00; B29C 65/40; B29C 65/48; B29C 65/70; B29C 66/00; B29C 66/80; B29C 66/81; B29C 66/812; B29C 66/8126; B29C 66/81264; B29C 66/814; B29C 66/8145; B29C 66/81455;
(Continued)

(56) References Cited

U.S. PATENT DOCUMENTS

| 2014/0150980 | A1* | 6/2014 | Itou ................... H01L 21/67132 |
| | | | 156/714 |
| 2017/0266947 | A1* | 9/2017 | Tateyama .................. B32B 7/04 |
| 2018/0168874 | A1* | 6/2018 | LaVon .............. A61F 13/15593 |

FOREIGN PATENT DOCUMENTS

| KR | 101619783 B1 | 5/2016 |
| KR | 101697488 B1 | 1/2017 |

(Continued)

*Primary Examiner* — Jacob T Minskey
*Assistant Examiner* — Matthew Hoover
(74) *Attorney, Agent, or Firm* — Cantor Colburn LLP

(57) ABSTRACT

A bonding device includes an upper chamber a pad with which a display substrate is pressable to a substrate; a stage between a lower chamber and the pad and including an opening through which air is introduced; a molding member between an upper chamber and the pad and surrounding the pad and the opening; and a support member connected to the stage The display substrate disposed on the molding member disposes first and second portions of the display substrate overlapping the planar and bending portions of the substrate, respectively, the molding member presses the first portion to the planar portion, and air introduced through the opening, expands the molding member to press the second portion to the bending portion.

10 Claims, 16 Drawing Sheets

(51) Int. Cl.
    *B29C 65/00*         (2006.01)
    *B32B 3/04*          (2006.01)
    *B29C 65/70*         (2006.01)
    *B29C 65/48*         (2006.01)
    *B32B 27/08*        (2006.01)
    *H05K 5/00*         (2006.01)

(52) U.S. Cl.
    CPC .. *B29C 66/81264* (2013.01); *B29C 66/81455* (2013.01); *B29C 66/83221* (2013.01); *B29C 66/90* (2013.01); *B32B 27/08* (2013.01); *B32B 2457/20* (2013.01); *H05K 5/0017* (2013.01)

(58) Field of Classification Search
    CPC ... B29C 66/83; B29C 66/832; B29C 66/8322; B29C 66/83221; B29C 66/90
    See application file for complete search history.

(56) References Cited

FOREIGN PATENT DOCUMENTS

| | | | |
|---|---|---|---|
| KR | 101706617 | B1 | 2/2017 |
| KR | 101737355 | A  | 5/2017 |
| KR | 101839112 | B1 | 3/2018 |

\* cited by examiner

BONDING DEVICE AND METHOD OF BONDING DISPLAY DEVICE USING THE SAME

This application claims priority to Korean Patent Application No. 10-2018-0078995, filed on Jul. 6, 2018, and all the benefits accruing therefrom under 35 U.S.C. § 119, the entire contents of which are hereby incorporated by reference.

BACKGROUND

(1) Field

The present disclosure herein relates to a bonding device, and more particularly, to a bonding device for bonding a window member of a display device to a display module thereof, and a method of bonding a display device using the bonding device.

(2) Description of the Related Art

Typically, a display device includes an organic light emitting display ("OLED"), a liquid crystal display ("LCD"), an electrophoretic display ("ED"), a surface-conduction electron-emitter display ("SED"), a vacuum fluorescent display panel ("VFD"), and the like.

The display device may be used for mobile devices such as a smartphone, a tablet personal computer ("PC"), a laptop computer, a digital camera, a camcorder, and a portable information terminal and electronic products such as a slim-type television, an exhibition display, and an advertisement board.

A flexible display device applicable to various shaped electronic devices has been developed, and a window member including a flat first display area and a second display area which is bent from the first display area has been developed for use in electronic devices. That is, considering the flexible display device and the window member described above, an image may be displayed through a front surface and a side surface of the window member.

SUMMARY

The present disclosure provides a bonding device for bonding a window member as a substrate of a display device to a display module as a display substrate thereof, by using a pad and a molding member of the bonding device, and a method of bonding substrates of the display device using the same.

An embodiment provides a method of bonding display device, the method including: providing a substrate of the display device, the substrate including a planar portion and a bending portion which is bent from the planar portion; providing a display substrate from which a display substrate of the display device is formed, on a stage of a bonding device, the providing the display substrate disposing a pad of the bonding device between the stage and the display substrate; pressing the pad of the bonding device to the display substrate to bond a first portion of the display substrate to the planar portion of the substrate; while the pad is pressed to the display substrate, providing air through a stage opening defined in the stage and disposed adjacent to the pad, to expand a molding member of the bonding device which surrounds the pad and is between the pad and the display substrate; and pressing the molding member which is expanded, to the display substrate, to bond a second portion of the display substrate adjacent to the first portion thereof, to the bending portion of the substrate.

In an embodiment, the stage opening provided in plural may include a first stage opening and a second stage opening each open at a top surface of the stage, and the first stage opening and the second stage opening may be spaced apart from each other with the pad therebetween along a first direction.

In an embodiment, the bending portion may include a first bending portion and a second bending portion, which face each other along the first direction, and the second portion may include a first display substrate bending portion bonded to the first bending portion and a second display substrate bending portion bonded to the second bending portion.

In an embodiment, the bonding of the second portion to the bending portion may include: pressing the first display substrate bending portion by the molding member expanded by air provided from the first stage opening; and pressing the second display substrate bending portion by the molding member expanded by air provided from the second stage opening.

In an embodiment, the stage opening provided in plural may further include a third stage opening and a fourth stage opening each open at the top surface of the stage, and the third stage opening and the fourth stage opening may be spaced apart from each other with the pad therebetween along a second direction crossing the first direction.

In an embodiment, the bending portion may further include a third bending portion and a fourth bending portion, which face each other along the second direction, and the second portion may further include: a third display substrate bending portion bonded to the third bending portion, by pressing of the third display substrate bending portion to the third bending portion by the molding member expanded by the air provided from the third stage opening; and a fourth display substrate bending portion bonded to the fourth bending portion, by pressing of the fourth display substrate bending portion to the fourth bending portion by the molding member expanded by the air provided from the fourth stage opening.

In an embodiment, the bonding of the first portion to the planar portion may include: moving the stage toward the substrate including the planar portion and the bending portion, along a thickness direction of the stage, by actuating a support member of the bonding device which is connected to the stage; and the actuating of the support member moving the pad and the molding member together with the stage to press the first portion of the display substrate to the planar portion of the substrate.

In an embodiment, the method may further include injecting the air into the first stage opening and the second stage opening through the support member.

In an embodiment, the air may be simultaneously injected into the first stage opening and the second stage opening, through the support member.

In an embodiment, the providing the substrate including the planar portion and the bending portion may include providing the substrate in an upper chamber of the bonding device. The stage of the bonding device may be disposed in a lower chamber of the bonding device which faces the upper chamber. The method may further include coupling the upper chamber having the substrate therein, and the lower chamber having the display substrate disposed on the stage, to each other.

In an embodiment, a bonding device includes: an upper chamber in which a substrate of a display device is disposable, the substrate including a planar portion and a bending portion which is extended from the planar portion; a lower chamber which is coupleable to the upper chamber; a pad between the upper chamber and the lower chamber, with which a display substrate of the display device is pressable to the substrate thereof; a stage between the lower chamber and the pad, the stage including a first area corresponding to the pad and a second area which is adjacent to the first area and in which a stage opening is provided in plural through which air is introduced; a molding member between the upper chamber and the pad, disposed on the second area of the stage and surrounding each of the pad and the stage opening which is provided in plural; and a support member connected to the stage. The display substrate which is disposed on the molding member disposes the substrate between the upper chamber and the display substrate, and disposes a first portion and a second portion of the display substrate overlapping the planar portion and the bending portion of the substrate, respectively, the molding member presses the first portion of the display substrate to the planar portion of the substrate, and air introduced through the stage opening provided in plural, while the first portion of the display substrate is pressed to the planar portion of the substrate, expands the molding member to press the second portion of the display substrate to the bending portion of the substrate.

In an embodiment, the molding member disposed on the second area of the stage may define a space between the molding member and the stage which is sealed from the outside of both the molding member and the stage.

In an embodiment, the bonding device may further include a nozzle provided in the stage opening and the air may be injectable into the nozzle through the support member.

In an embodiment, the stage opening provided in plural may include a first stage opening and a second stage opening which are spaced apart from each other with the pad therebetween along a first direction.

In an embodiment, the stage opening provided in plural may further include a third stage opening and a fourth stage opening which are spaced apart from each other with the pad therebetween along a second direction crossing the first direction.

In an embodiment, the bending portion may include: a first bending portion and a second bending portion, which face each other along the first direction; and a third bending portion and a fourth bending portion, which face each other along the second direction.

In an embodiment, the bonding device may further include a fixing member disposed on the second area while surrounding the first area, and the molding member may be fixable to the stage by the fixing member.

In an embodiment, the support member may include: a transfer member connected to the stage and extended to outside of the lower chamber, the stage being movable toward and away from the upper chamber by vertical movement of the transfer member along a thickness direction of the stage; and a control member which controls the vertical movement of the transfer member.

In an embodiment, the molding member may be pressable by the pad according to the vertical movement of the transfer member by which the stage is movable.

In an embodiment, the molding member may be an elastic layer.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1A:
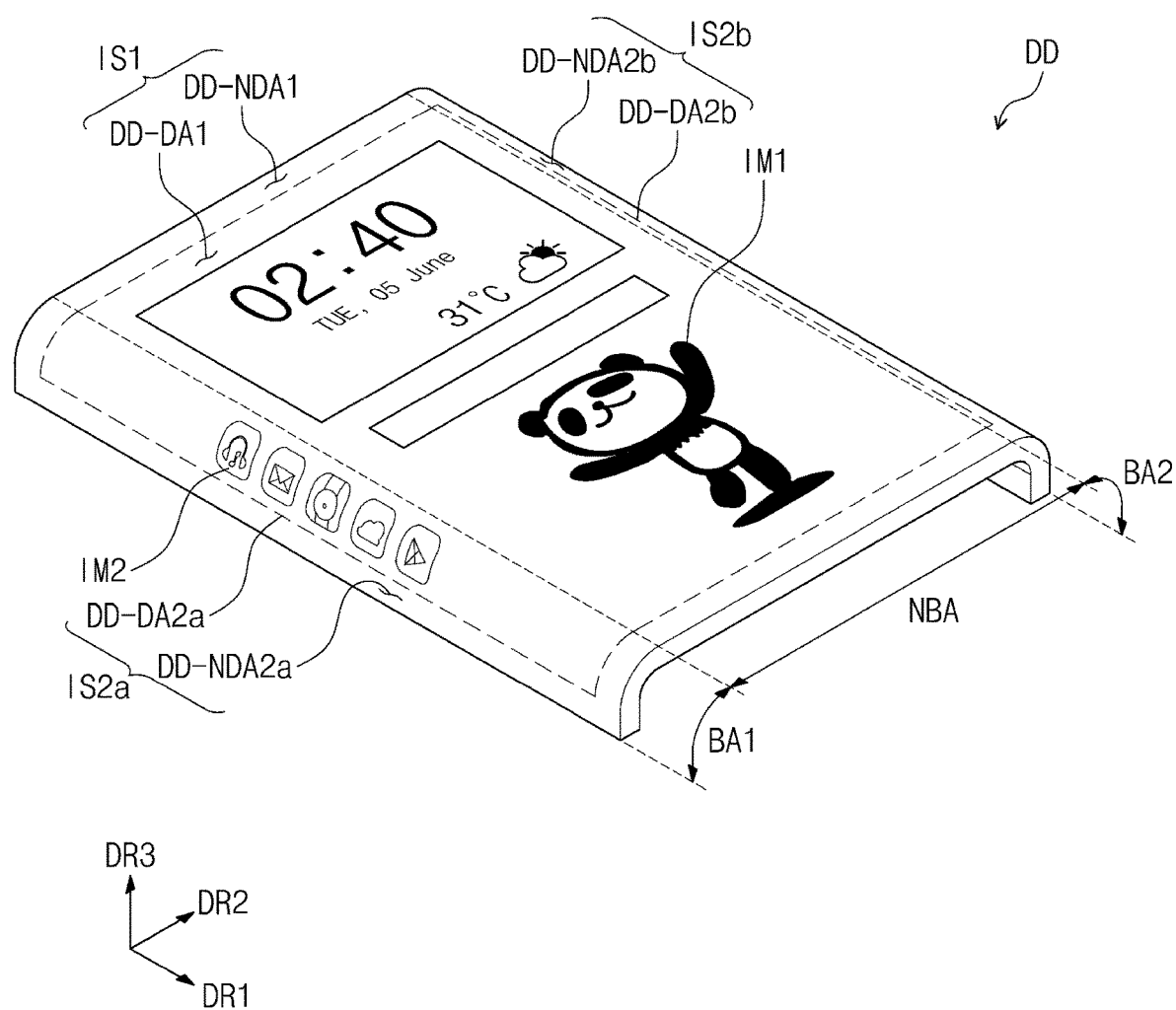
FIG. 1A is a perspective view illustrating an embodiment of a display device which is bonded using a bonding device.

In this specification, it will also be understood that when one component (or region, layer, portion) is referred to as being related to another element such as being 'on', 'connected to', or 'coupled to' another component, it can be directly disposed/connected/coupled on/to the one component, or an intervening third component may also be present. In contrast, when one component (or region, layer, portion) is referred to as being related to another element such as being 'directly on', 'directly connected to', or 'directly coupled to' another component, no intervening third component is present.

Like reference numerals refer to like elements throughout. Also, in the figures, the thickness, ratio, and dimensions of components are exaggerated for clarity of illustration.

The terminology used herein is for the purpose of describing particular embodiments only and is not intended to be limiting. As used herein, the singular forms "a," "an," and "the" are intended to include the plural forms, including "at least one," unless the content clearly indicates otherwise.

"At least one" is not to be construed as limiting "a" or "an." "Or" means "and/or." The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, "under," "below," "above," "upper" and the like are used for explaining relation association of components illustrated in the drawings. The terms may be a relative concept and described based on directions expressed in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a fixed number, a step, an operation, an element, a component or a combination thereof, but does not exclude other properties, fixed numbers, steps, operations, elements, components or combinations thereof.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Referring to FIG. 1A, a display device DD may include a planar area NBA at which the display device DD and/or components thereof are flat, and a first bending area BA1 and a second bending area BA2 at which the display device DD and/or components thereof are disposed bent from and relative to the planar area NBA. Each of the first bending area BA1 and the second bending area BA2 may be bent from the planar area NBA along the same direction. The planar area NBA may correspond to a front surface of the display device DD, and the first bending area BA1 and the second bending area BA2 may correspond to a side surface of the display device DD.

The planar area NBA includes or defines a first display surface IS1, the first bending area BA1 includes or defines a second display surface IS2$a$, and the second bending area BA2 includes or defines a third display surface IS2$b$. Each of the first display surface IS1, the second display surface IS2$a$ and the third display surface IS2$b$ may be an outermost or external surface of the display device DD, without being limited thereto.

The first display surface IS1 of the planar area NBA includes a first display area DD-DA1 and a first bezel area DD-NDA1 which is disposed adjacent to the first display area DD-DA1. Hereinafter, a display area is defined as an area at which an image is substantially displayed, and a bezel area is defined as an area at which an image is not displayed. Here, the bezel area may have various colors, such as through a printed layer. The various colors of the bezel area may be viewable from outside the display device DD.

The planar area NBA may be disposed in a plane which is parallel to a plane defined by a first direction DR1 and a second direction DR2. As illustrated in FIG. 1A, for example, each of the first bending area BA1 and the second bending area BA2 may be bent from the planar area NBA along the second direction DR2. A normal direction of the display device DD indicates a third direction DR3. The third direction DR3 indicates a thickness direction of the display device DD and/or components thereof. Also, a front surface (top surface) and a rear surface (bottom surface) of each of members are distinguished along the third direction DR3. However, directions indicated in the directions DR1, DR2, and DR3 may be relative concepts and converted with respect to each other.

The second display surface IS2$a$ of the first bending area BA1 includes a second display area DD-DA2$a$ and a second bezel area DD-NDA2$a$ which is disposed adjacent to the second display area DD-DA2$a$. Along the second direction DR2, the second display area DD-DA2$a$ may be bent from a side of the first display area DD-DA1, and the second bezel area DD-NDA2$a$ may be bent from a side of the first bezel area DD-NDA1 which corresponds to the side of the first display area DD-DA1.

The third display surface IS2$b$ of the second bending area BA2 includes a third display area DD-DA2$b$ and a third bezel area DD-NDA2$b$ which is disposed adjacent to the third display area DD-DA2$b$. Along the second direction DR2, the third display area DD-DA2$b$ may be bent from a side of the first display area DD-DA1 which is opposite to the first bending area BA1, and the third bezel area DD-NDA2$b$ may be bent from a side of the first bezel area DD-NDA1 which corresponds to the side of the first display area DD-DA1 which is opposite to the first bending area BA1.

According to an embodiment, each of the first display area DD-DA1, the second display area DD-DA2$a$ and the third display area DD-DA2$b$ may display an image. In an embodiment, for example, as illustrated in FIG. 1A, the first display area DD-DA1 displays a first image IM1 collectively including a clock window and a bear, and the second display area DD-DA2$a$ displays one or more of a second image IM2 including an icon. Although not shown, the third display area DD-DA2$b$ also may display a third image. The first image IM1, the second image IM2 and the third image IM3 may be the same image as each other or different images from each other.

However, the invention is not limited thereto. In an embodiment, for example, the images displayed on the first display area DD-DA1, the second display area DD-DA2a and the third display area DD-DA2b may be portions of a one image which area connected to each other to be displayed as one continuous image.

Also, although the first bezel area DD-NDA1, the second bezel area DD-NDA2a, and the third bezel area DD-NDA2b are illustrated in FIG. 1A, at least one of or all of a bezel area among the first bezel area DD-NDA1, the second bezel area DD-NDA2a, and the third bezel area DD-NDA2b may be omitted.

Figure 1B:
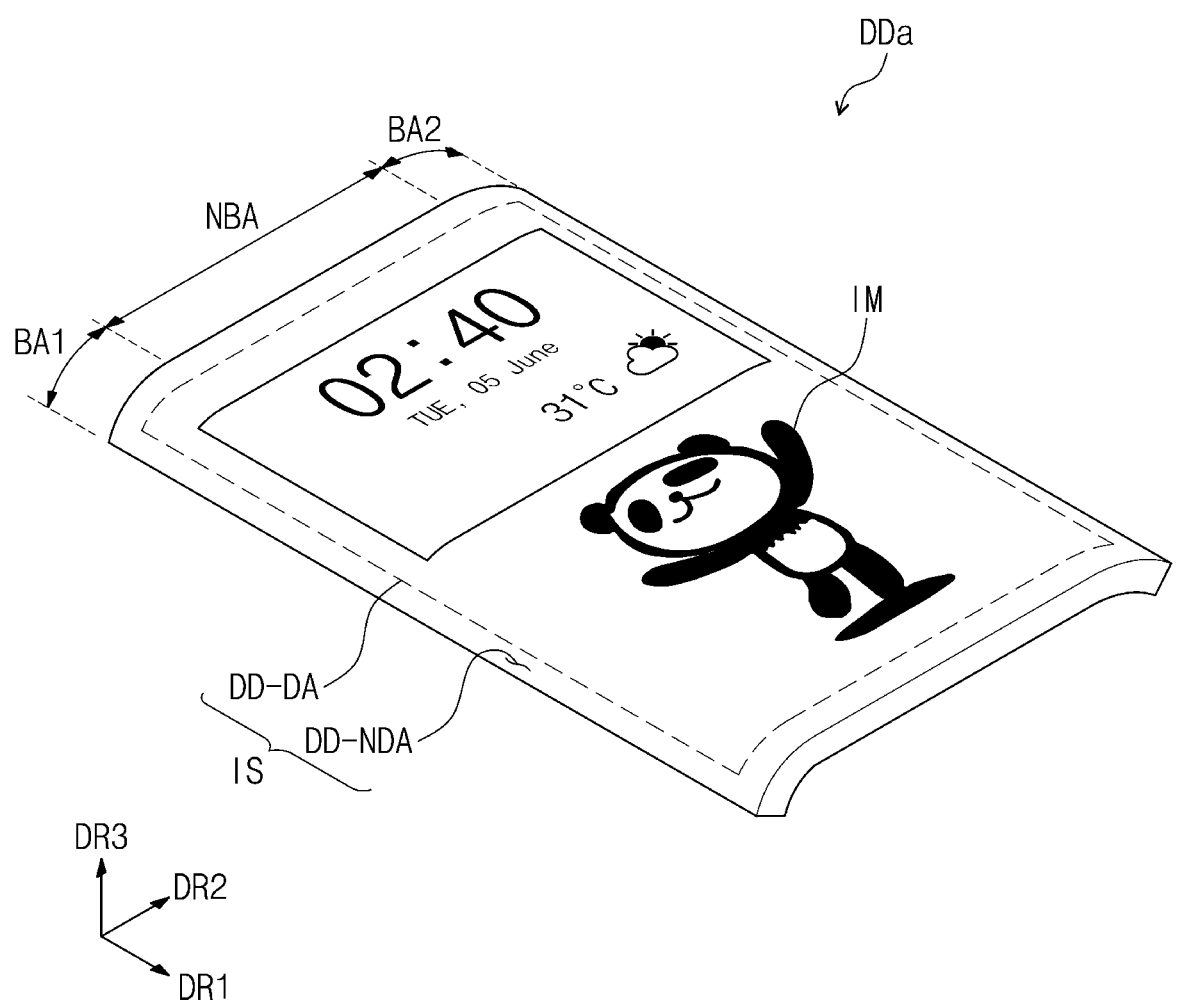
FIG. 1B is a perspective view illustrating another embodiment of a display device which is bonded using a bonding device.

A display device in FIG. 1B may include a first bending area BA1 and a second bending area BA2, which are bent at different angles from opposing sides of a planar area NBA, along the second direction DR2, respectively. In an embodiment, for example, relative to the planar area NBA, the first bending area BA1 and the second bending area BA2 in FIG. 1B may be bent at angles which are less than angles at which the first bending area BA1 and the second bending area BA2 are bent in FIG. 1A.

Also, the display device DDa may display one image IM within a single display area DD-DA disposed adjacent to a single bezel area DD-NDA among portions of a display surface IS. The image IM is disposed at the planar area NBA, among the planar area NBA, the first bending area BA1 and the second bending area BA2. In an embodiment, for example, the image IM collectively includes a clock window and a bear. The single display area DD-DA of the display device DDa in FIG. 1B may not display different images at the planar area NBA, the first bending area BA1 and the second bending area BA2, unlike the display device DD in FIG. 1A. The planar area NBA, the first bending area BA1 and the second bending area BA2 in the display device DDa may each include a portion of the single display area DD-DA.

Figure 1C:
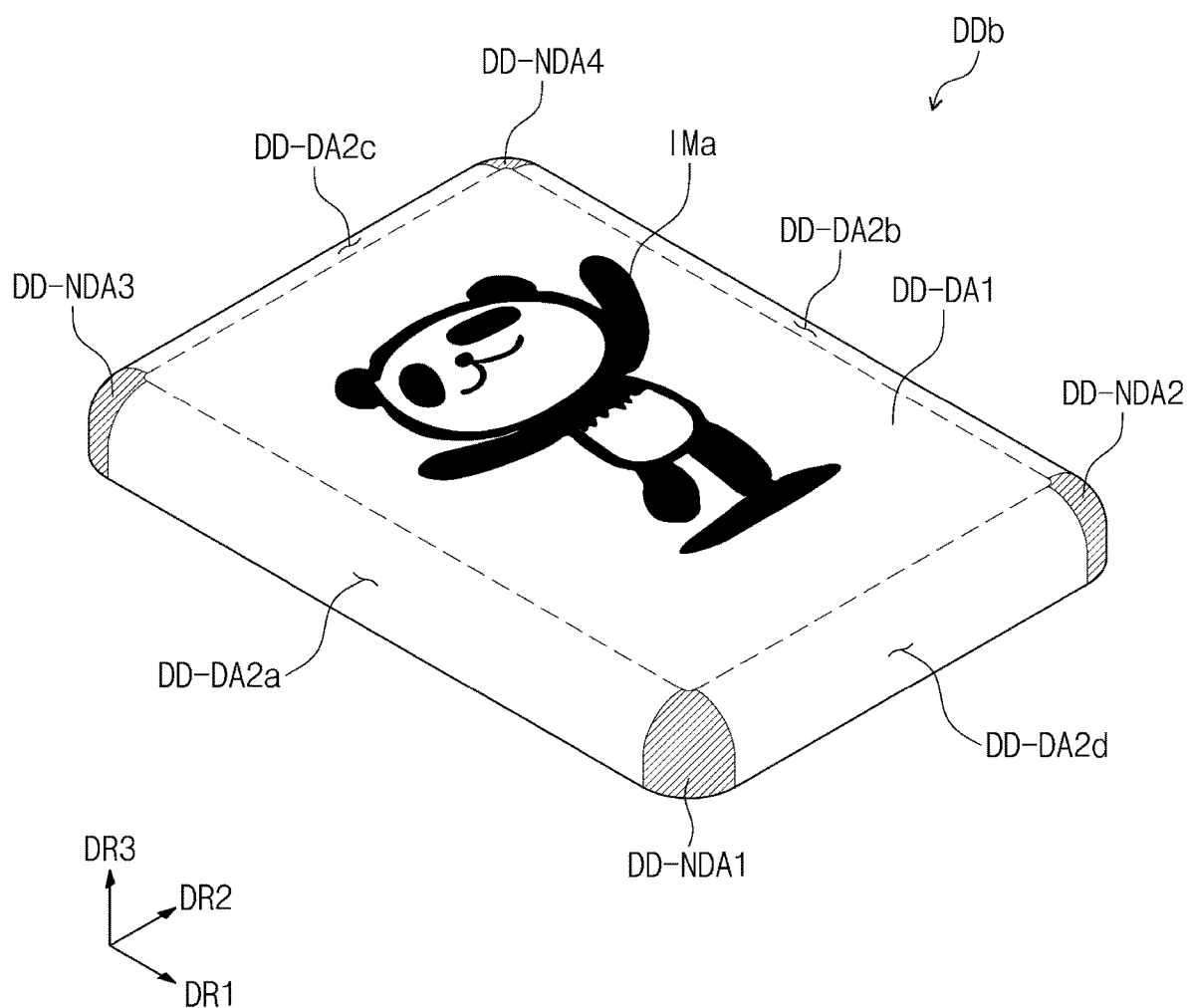
FIG. 1C is a perspective view illustrating another embodiment of a display device which is bonded using a bonding device.

Referring to FIG. 1C, a display device DDb includes a main display area DD-DA1, and a first display area DD-DA2a, a second display area DD-DA2b, a third display area DD-DA2c and a fourth display area DD-DA2d which are respectively bent from sides of the main display area DD-DA1. The main display area DD-DA1 may correspond to a front surface of the display device DDb, and the first display area DD-DA2a, the second display area DD-DA2b, the third display area DD-DA2c and the fourth display area DD-DA2d may respectively correspond to side surfaces of the display device DDb. The first display area DD-DA2a, the second display area DD-DA2b, the third display area DD-DA2c and the fourth display area DD-DA2d may each extend to an edge of the display device DDb.

The first display area DD-DA2a and the second display area DD-DA2b may face each other and be bent from opposing sides of the main display area DD-DA1, along the second direction DR2. The third display area DD-DA2c and the fourth display area DD-DA2d may face each other and be bent from opposing sides of the main display area DD-DA1, along the first direction DR1.

Also, the display device DDb may include a first corner bezel area DD-NDA1, a second corner bezel area DD-NDA2, a third corner bezel area DD-NDA3 and a fourth corner bezel area DD-NDA4. Also, the first corner bezel area DD-NDA1, the second corner bezel area DD-NDA2, the third corner bezel area DD-NDA3 and the fourth corner bezel area DD-NDA4 may correspond to the side surfaces of the display device DDb at the corners thereof.

Along a plane defined by the first direction DR1 and the second direction DR2, the first corner bezel area DD-NDA1 may be disposed between the first display area DD-DA2a and the fourth display area DD-DA2d. The second corner bezel area DD-NDA2 may be disposed between the second display area DD-DA2b and the fourth display area DD-DA2d. The third corner bezel area DD-NDA3 may be disposed between the first display area DD-DA2a and the third display area DD-DA2c. The fourth corner bezel area DD-NDA4 may be disposed between the second display area DD-DA2b and the third display area DD-DA2c.

According to an embodiment, the main display area DD-DA1 may have a planar shape disposed in a plane which is parallel to a plane defined by the first direction DR1 and the second direction DR2, and each of the first display area DD-DA2a, the second display area DD-DA2b, the third display area DD-DA2c and the fourth display area DD-DA2d and the first corner bezel area DD-NDA1, the second corner bezel area DD-NDA2, the third corner bezel area DD-NDA3 and the fourth bezel area may have a curved shape. As having the curved shape, the various areas may be disposed in three dimensions, such as along each of the first direction DR1, the second direction DR2 and the third direction DR3.

Also, the display device DDb may display an image IMa within the main display area DD-DA1. The image IMa is disposed at the planar area NBA. The main display area DD-DA1 of the display device DDb in FIG. 1C may display a same image or different images from the first display area DD-DA2a, the second display area DD-DA2b, the third display area DD-DA2c and the fourth display area DD-DA2d.

Figure 1D:
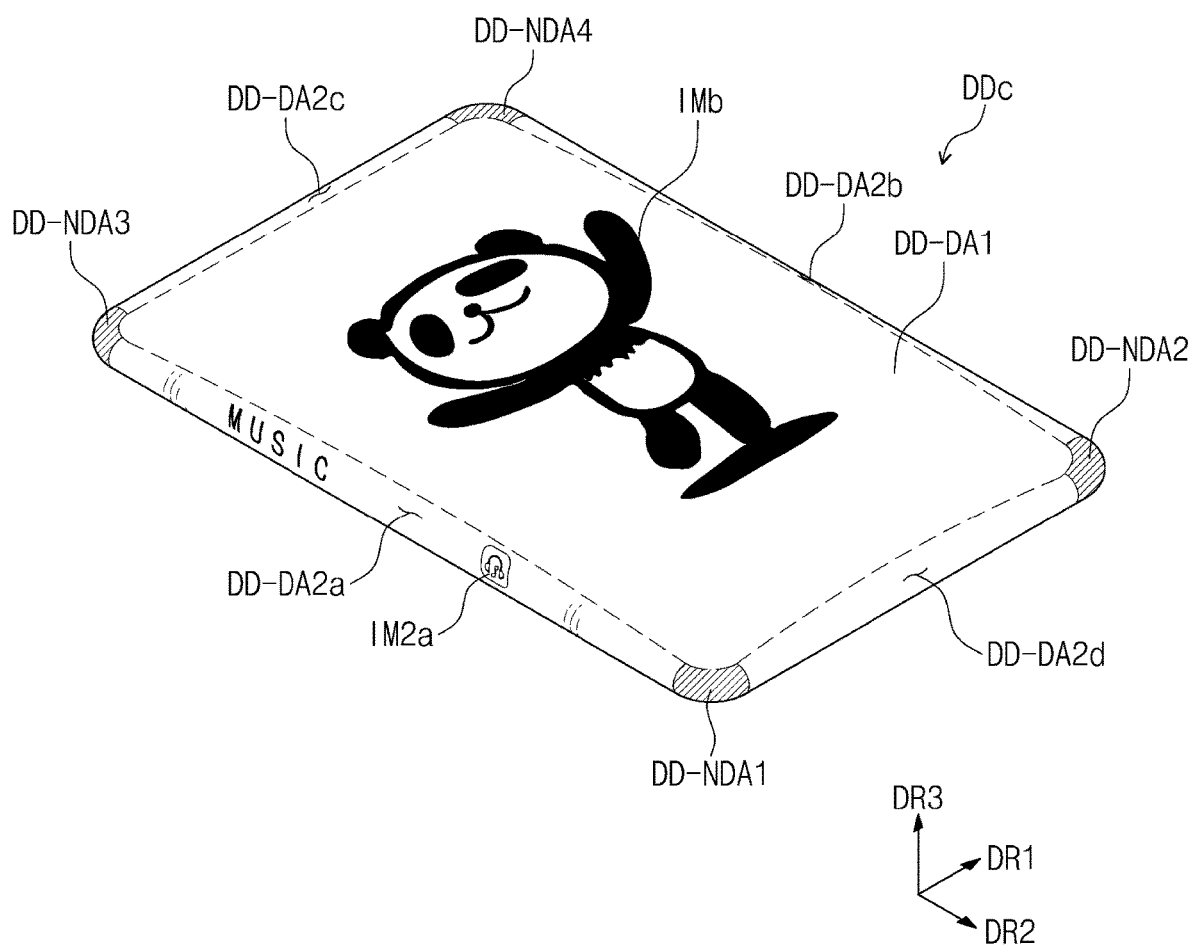
FIG. 1D is a perspective view illustrating another embodiment of a display device which is bonded using a bonding device.

A display device DDc in FIG. 1D may have a main display area DD-DA1 having a shape extending along three dimensions. In an embodiment, a shape of the main display area DD-DA1 may protrude in the third direction DR3 from a plane defined by the first direction DR1 and the second direction DR2. As a result, as illustrated in FIG. 1D, when viewed along the first direction DR1, a central portion of each of the first display area DD-DA2a and the second display area DD-DA2b has a thickness greater than a thickness of end portions opposing each other along the second direction DR2. Similarly, when viewed along the second direction DR2, a central portion of each of the third display area DD-DA2c and the fourth display area DD-DA2d has a thickness greater than a thickness of end portions opposing each other along the first direction DR1.

Figure 2A:
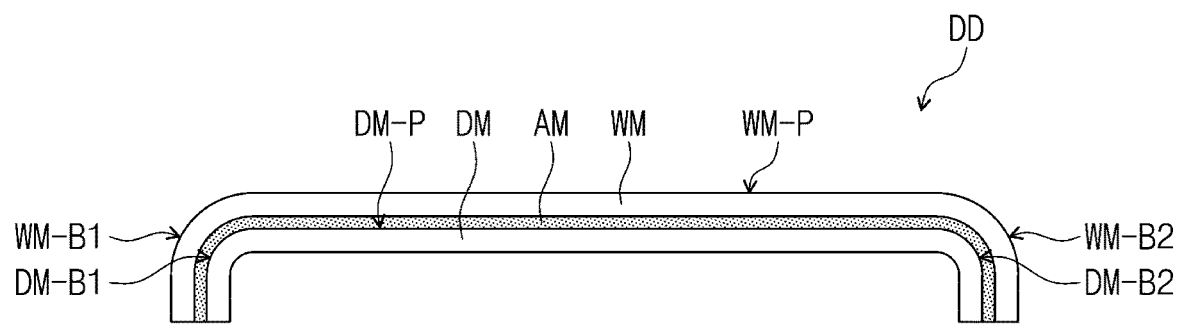
FIG. 2A is a cross-sectional view illustrating the display device in FIG. 1A which is bonded using a bonding device.
Figure 2B:
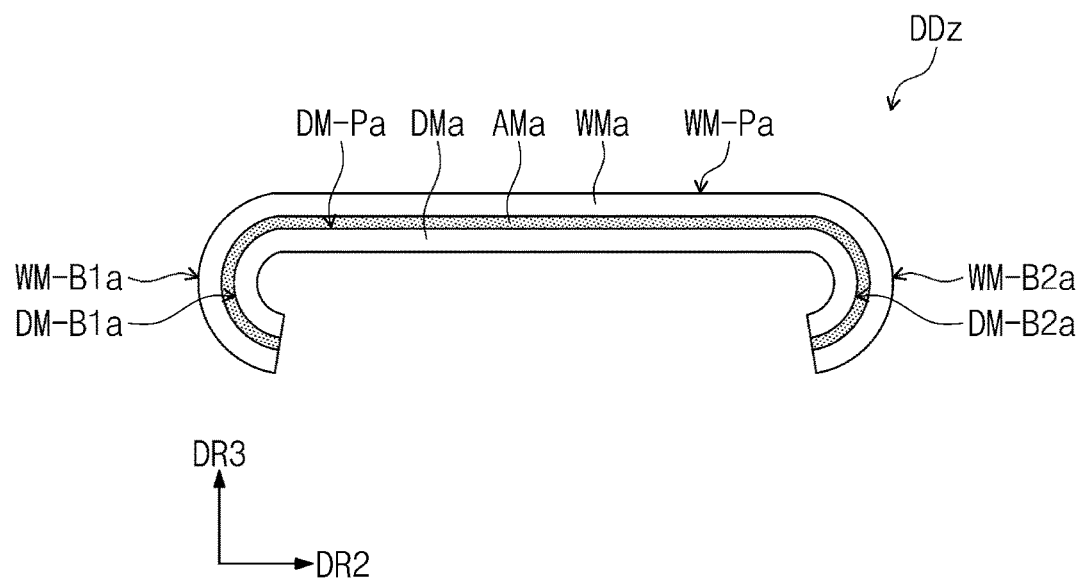
FIG. 2B is a cross-sectional view illustrating another embodiment of a display device which is bonded using a bonding device.

FIG. 2A is a cross-sectional view illustrating an embodiment of the display device in FIG. 1A of which portions thereof area bonded using a bonding device. FIG. 2B is a cross-sectional view illustrating another embodiment of a display device of which portions thereof are bonded using a bonding device.

Referring to FIG. 2A, the display device DD may include a window member WM, a display module DM, and an adhesive member AM.

The window member WM may be bonded to a front surface of the adhesive member AM. The window member WM may be a component through which an image is substantially visible from outside the display device DD. According to an embodiment, the window member WM may be a substrate. The substrate may include a plastic substrate, a glass substrate, or an organic/inorganic composite substrate. Also, the substrate may be a laminated structure including a plurality of insulation layers. The plastic substrate may include at least one of an acrylic-based resin, a methacryl-based resin, polyisoprene, a vinyl-based resin, an epoxy-based resin, a urethane-based resin, a cellulosebased resin, a siloxane-based resin, a polyimide-based resin, a polyamide-based resin, and a perylene-based resin.

The adhesive member AM may be disposed between the window member WM and the display module DM. The adhesive member AM may fix the window member WM and the display module DM to each other. The adhesive member AM may include a double-sided adhesive agent. In an embodiment, for example, the adhesive member AM may include an optically clear adhesive film ("OCA"), an optically clear resin ("OCR"), or a pressure sensitive adhesive film ("PSA").

The display module DM may be bonded to a rear surface of the adhesive member AM. The display module DM may include a display panel which generates and/or outputs an image, and a pressure sensing unit for sensing an external touch. However, the invention is not limited thereto. In an embodiment, for example, the display panel may be an organic light emitting display panel or a quantum dot light emitting display panel. The organic light emitting display panel includes a light emitting layer containing an organic light emitting material. The quantum dot light emitting display panel includes a light emitting layer containing a quantum dot or a quantum rod.

The input sensing unit may detect an input applied to the display module DM and/or the display device DD from outside thereof. The input applied from outside the display module DM and/or the display device DD may be provided in various types. In an embodiment, for example, the external input may be provided by any of a number of tools including a portion of a user's body, a stylus pen, light, heat, or pressure. Also, in addition to a contact input by a portion of the user's body (e.g., a hand) contacting the display module DM and/or the display device DD, a spatial touch in which an input tool hovers, approaches, is disposed adjacent to, etc. may provide the input. In an embodiment, the input sensing unit may be omitted.

According to an embodiment, the window member WM and/or the display module DM may be described as being or including a substrate, and the substrate may be a flexible substrate that is bendable. As an example, the window member WM may be referred to as a "substrate" while the display module DM may be referred to as a "display substrate."

According to an embodiment, the window member WM includes a first window bending portion WM-B1 and a second window bending portion WM-B2, which are each bent from a window planar portion WM-P to face each other along the second direction DR2. As illustrated in FIG. 2A, the first window bending portion WM-B1 and the second window bending portion WM-B2 of the window member WM may be bent at an angle about 90 degrees relative to a plane in which the window planar portion WM-P is disposed.

The window planar portion WM-P of the window member WM may overlap the planar area NBA in FIG. 1A, and the first window bending portion WM-B1 and the second window bending portion WM-B2 may overlap the first bending area BA1 and the second bending area BA2, respectively.

The display module DM includes a first display substrate planar portion DM-P as a first portion of the display module DM, and a first display substrate bending portion DM-B1 and a second display substrate bending portion DM-B2 which are each bent from the display substrate planar portion DM-P to face each other along the second direction DR2, as a collective second portion of the display module DM. The first display substrate bending portion DM-B1 and the second display substrate bending portion DM-B2 of the display module DM may be bent at an angle about 90 degrees relative to a plane in which the display substrate planar portion DM-P of the display module DM is disposed. The display substrate planar portion DM-P of the display module DM may overlap the planar area NBA in FIG. 1A, and the first display substrate bending portion DM-B1 and the second display substrate bending portion DM-B2 may overlap the first bending area BA1 and the second bending area BA2, respectively.

Although not shown, in another embodiment, the window member WM may further include a third window bending portion and a fourth window bending portion, which are respectively bent from opposing sides of the window planar portion WM-P along the first direction DR1 to face each other along the first direction DR1.

In this case, the first window bending portion WM-B1 of the window member WM may correspond to the first display area DD-DA2a in FIG. 1C. The second window bending portion WM-B2 of the window member WM may correspond to the second display area DD-DA2b in FIG. 1C. The third window bending portion (not shown) of the window member WM may correspond to the third display area DD-DA2c in FIG. 1C. The fourth bending portion (not shown) of the window member WM may correspond to the fourth display area DD-DA2d in FIG. 1C.

Referring to FIG. 2B, in another embodiment, a first window bending portion WM-B1a and a second window bending portion WM-B2a of a window member WMa are bent at about 90 degrees or more with respect to a plane in which a window planar portion WM-Pa of the window member WMa is disposed. Also, a first display substrate bending portion DM-B1a and a second display substrate bending portion DM-B2a of a display module DMa may be bent at 90° or more from a display substrate planar portion DM-Pa of the display module DMa. As illustrated in FIG. 2B, an adhesive member AMa may be disposed between the window member WMa and the display module DMa to fix the window member WMa and the display module DMa to each other.

Figure 3:
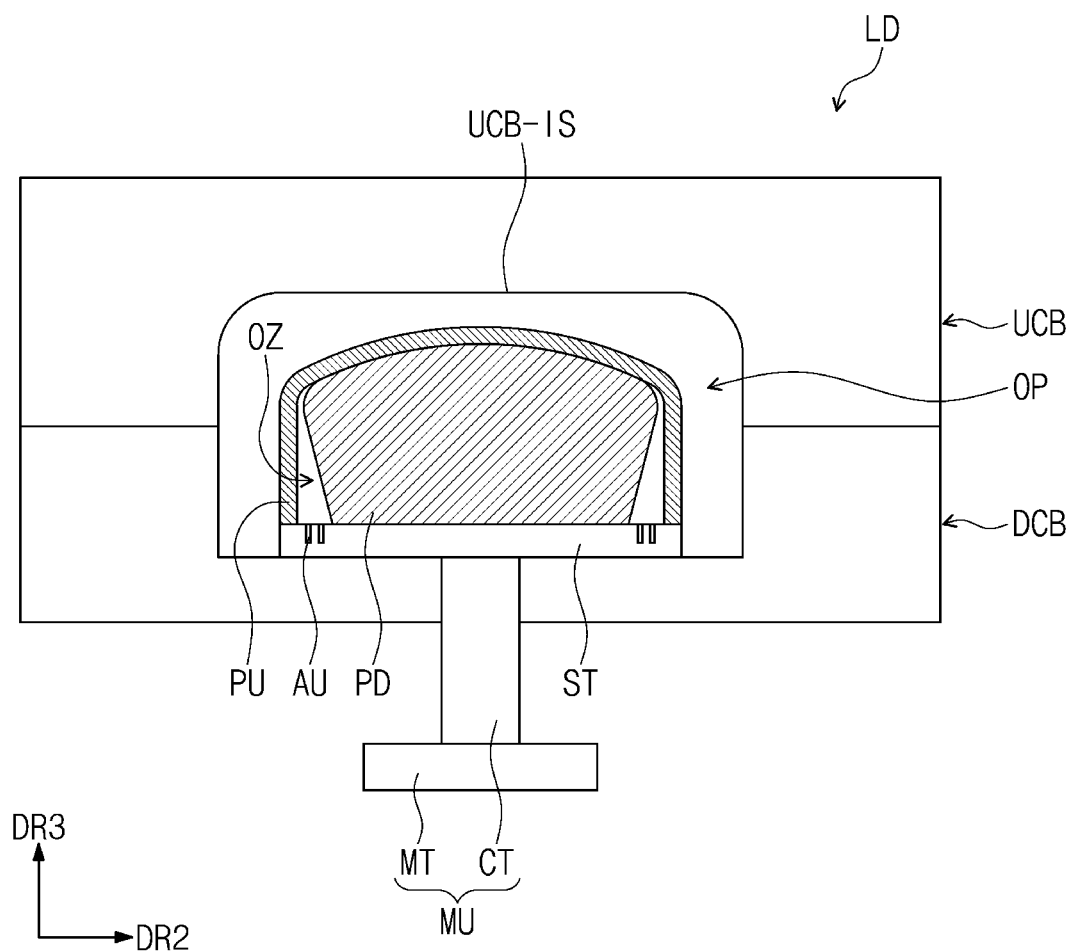
FIG. 3 is a cross-sectional view illustrating an embodiment of a bonding device with which portions of a display device are bonded to each other.
Figure 4:
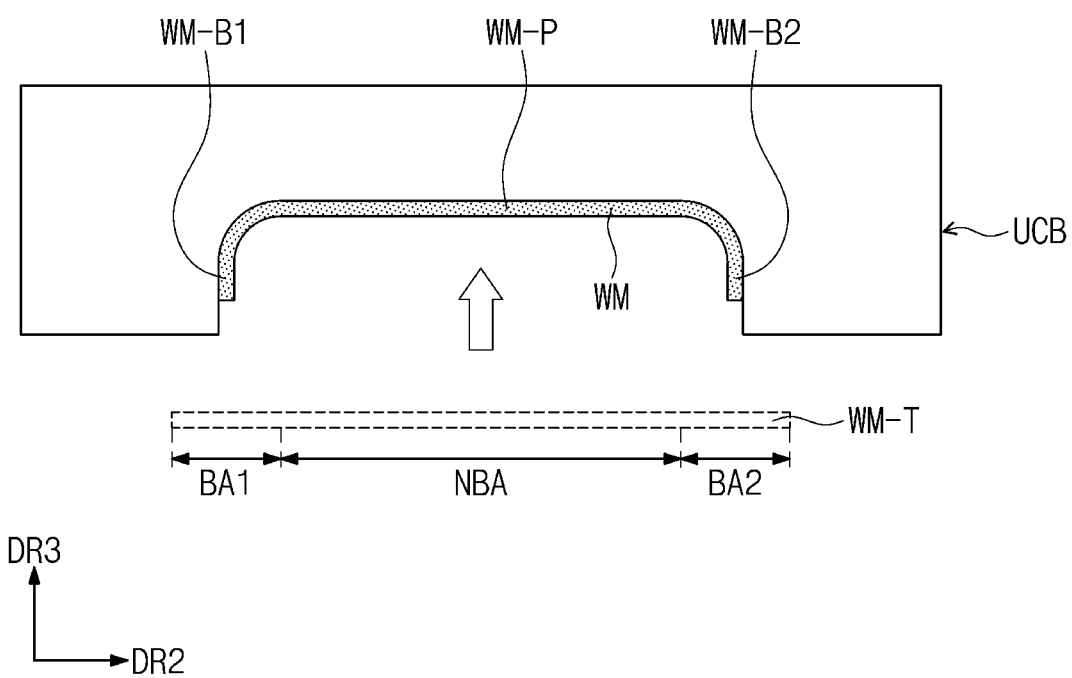
FIG. 4 is a cross-sectional view illustrating an embodiment of a window member of a display device disposed on an upper chamber of the bonding device in FIG. 3.
Figure 5A:
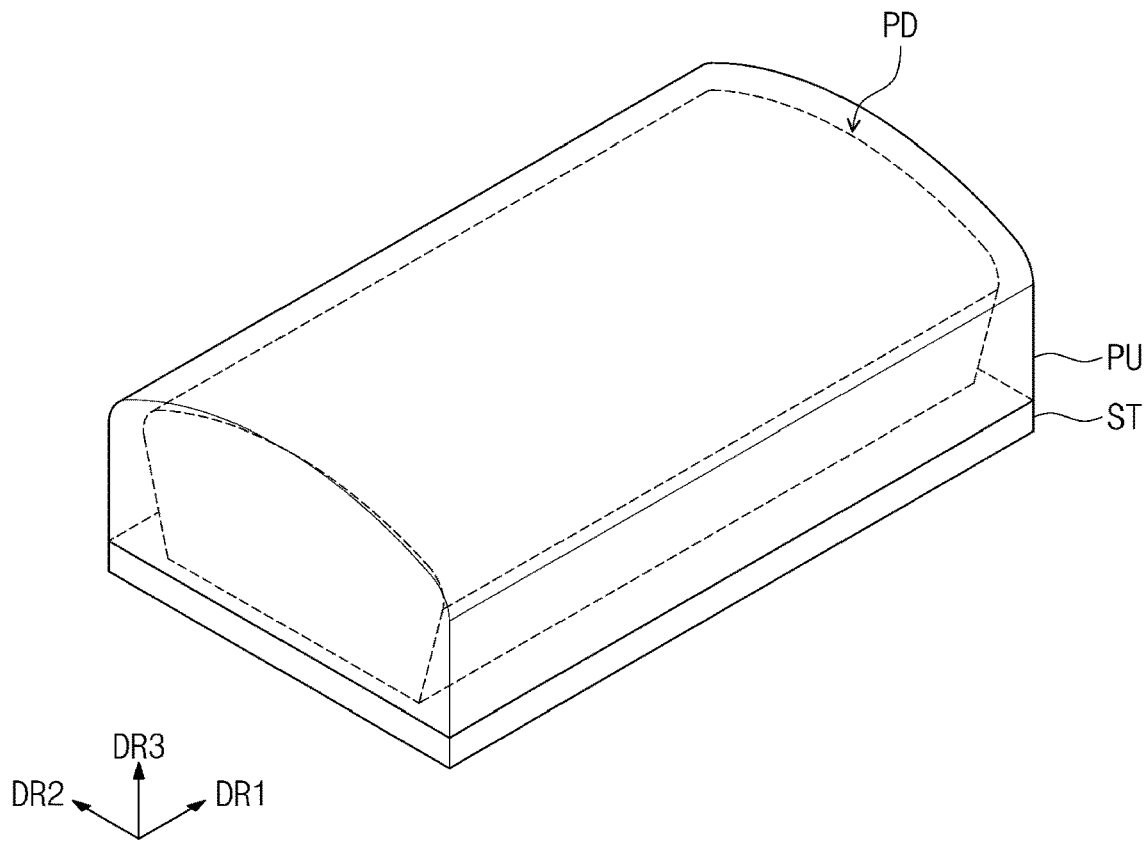
FIG. 5A is a perspective view illustrating an embodiment of a portion of the bonding device in FIG. 3.
Figure 5B:
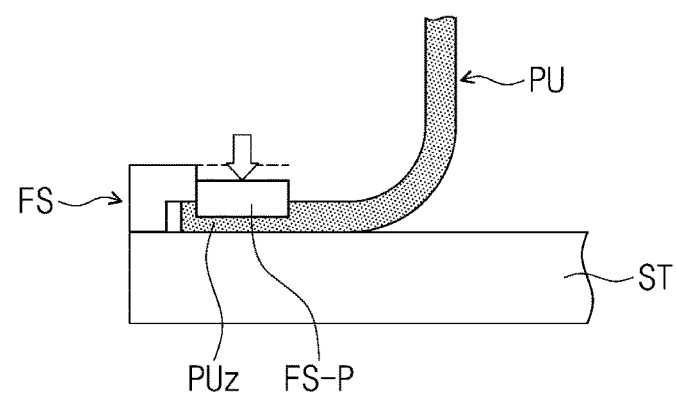
FIG. 5B is a view illustrating an embodiment of a coupling structure between a fixing member and a molding member of a bonding device with which portions of a display device are bonded to each other.

FIG. 3 is a cross-sectional view illustrating an embodiment of a bonding device with which portions of a display device are bonded to each other. FIG. 4 is a cross-sectional view illustrating an embodiment of an upper chamber and a window member which is disposed on the upper chamber of the bonding device in FIG. 3. FIG. 5A is a perspective view illustrating an embodiment of a portion of the bonding device in FIG. 3. FIG. 5B is a view illustrating an embodiment of a coupling structure between a fixing member and a molding member of a bonding device with which portions of a display device are bonded to each other.

Referring to FIGS. 2A and 3, a bonding device LD includes an upper chamber UCB, a lower chamber DCB, a support member MU, a stage ST, a pad PD, and a molding member PU.

The upper chamber UCB may include a seat surface UCB-IS on which a window member WM is disposable. The seat surface UCB-IS may be defined as an inner surface of the upper chamber UCB. The window member WM including a window planar portion WM-P, a first window bending portion WM-B1 and a second window bending portion WM-B2 may be respectively disposable on the seat surface UCB-IS.

As illustrated in FIG. 4, a preliminary window member WM-T having a planar shape is provided, from which the window member WM may be formed. The preliminary window member WM-T having a planar shape may be molded into a shape including the planar area NBA, and a first bending area BA1 and a second bending area BA2 each of which bent from the planar area NBA, by external equipment. The preliminary window member WM-T in FIG. 4 may be molded in various methods. That is, the preliminary window member WM-T may be molded to have the planar area NBA, and the first bending area BA1 and the second bending area BA2 separate from and before insertion in to the upper chamber UCB, without being limited thereto.

The molded window member WM may be seated on the seat surface UCB-IS of the upper chamber UCB. That is, an overall shape of the seat surface UCB-IS may correspond to an overall shape defined by the planar area NBA, the first bending area BA1 and the second bending area BA2 of the window member WM and/or a finally-formed display device including such window member WM.

Referring to FIG. 3 again, the lower chamber DCB may be coupleable to the upper chamber UCB. The lower chamber DCB and the upper chamber UCB coupled to each other defines an inner space OP between the lower chamber DCB and the upper chamber UCB. The inner space OP may represent a substantial space in which a bonding process between the window member WM and the display module DM is performed. The inner space OP defined by the lower chamber DCB and the upper chamber UCB coupled to each other may be maintained in a vacuum state. Also, at least one hole into which the support member MU is insertable may be defined in the lower chamber DCB.

Each of the stage ST, the pad PD, and the molding member PU may be disposed in the inner space OP. Also, the window member WM and the display module DM, which are molded by the bonding device LD, may be also disposed in the inner space OP.

In detail, the stage ST may be disposable on the lower chamber DCB. One or more of an opening AU may be defined recessed from a top surface of the stage ST. The opening AU may be open at the top surface of the stage ST. According to an embodiment, air may be provided from the openings AU and into the inner space OP. Regarding this, detailed description will be provided through FIG. 6B.

The pad PD may be disposable on a top surface of the stage ST. According to an embodiment, the pad PD may contain an elastic material. In an embodiment, for example, the pad PD may include or be made of an elastic material such as rubber or silicon. However, the embodiment is not limited thereto. The one or more of the opening AU defined in the stage ST may not overlap the pad PD along a plane direction and may be defined adjacent to the pad PD at the top surface of the stage ST.

The support member MU includes a transfer member CT and a control member MT which is coupled to the transfer member CT and movable concurrently therewith. The transfer member CT may be insertable into and out of the hole defined in the lower chamber DCB and coupled to a bottom surface of the stage ST. According to an embodiment, the transfer member CT may be transferrable along the third direction DR3 under control of the control member MT. In an embodiment, for example, under the control of the control member MT, when the transfer member CT causes the stage ST to vertically ascend in the third direction DR3, the pad PD may also vertically ascend in the third direction DR3.

The molding member PU may be disposable on the top surface of the stage ST while surrounding each of the one of more of the opening AU and the pad PD in a top plan view (e.g., a view along the third direction DR3 of the plane defined by the first direction DR1 and the second direction DR2). According to an embodiment, the molding member PU may be a layer that has elasticity, is deformable by an external pressure and returnable to an original shape without the external pressure. In an embodiment, for example, the molding member PU may be a diaphragm that is expandable and contractible according to the external pressure or a rubber plate having improved elongation rate and durability. That is, the molding member PU may be various types of layers that are expandable in volume due to elongation. The embodiment is not limited to the above-described layers.

The display module DM may be disposable on the molding member PU. The display module DM may be disposed on the molding member PU while the window member WM is disposed on the seat surface UCB-IS of the upper chamber UCB. According to an embodiment, the display module DM may be bonded to the window member WM by being pressed against the window member WM by pressure applied using the molding member PU and the pad PD. Regarding this, detailed description will be provided through FIGS. 8A to 8B.

Referring to FIG. 5A, the molding member PU may be fixable to the top surface of the stage while surrounding an entirety of the pad PD. An upper portion of the molding member PU may be disposed facing an upper surface of the pad PD, and a lower portion of the molding member PU may be fixable to the top surface of the stage ST such as through a fixing member FS.

Referring to FIG. 5B, the bonding device LD may further include the fixing member FS disposed on the top surface of the stage ST. The fixing member FS may be coupleable to and removable from a distal end portion PUz of the molding member PU. That is, the molding member PU may be removably attachable to the stage ST, without being limited thereto.

In detail, a coupling space is defined between the fixing member FS and the stage ST. The distal end portion PUz of the molding member PU is insertable into the coupling space. A pressing portion FS-P of the fixing member FS may be pressable to and removable from the distal end portion PUz. As a result, as the pressing portion FS-P of the fixing member FS and the distal end portion PUz closely contact each other, an inner space of the molding member PU in which the pad PD is disposable, may be separated from a space outside the molding member PU.

The coupling method between the fixing member FS and the molding member PU may be variously provided. In another embodiment, the fixing member FS and the molding member PU may be removably coupled to each other by using a bolt. The fixing member FS may be omitted, such that the molding member PU may be directly connectable to the top surface of the stage ST.

According to an embodiment, the fixing member FS is coupled to the molding member PU seals the inner space between the molding member PU and the stage ST from the space outside the molding member PU and the stage ST. The sealed space between the molding member PU and the stage ST may represent an inner space surrounded by the molding member PU.

When air is sprayed from the one or more of the opening AU defined at the top surface of the stage ST, the sprayed air may be filled into the inner space which is sealed between the molding member PU and the stage ST. According to a density of the air as a gas filled between the molding member PU and the stage ST, a degree of expansion or contraction of the molding member PU within the inner space may be controlled. Also, as the molding member PU is expanded, the molding member PU may press at least one portion of the display module DM disposed on the molding member PU. That is, while the molding member PU is secured to the stage ST, the molding member PU may be movable (e.g., expanded and contracted) relative to the pad PD, such as to conform to a profile formed by the inner walls of the upper chamber UCB and the lower chamber DCB and/or a profile defined by the window member WM and/or the display module DM.

Figure 6A:
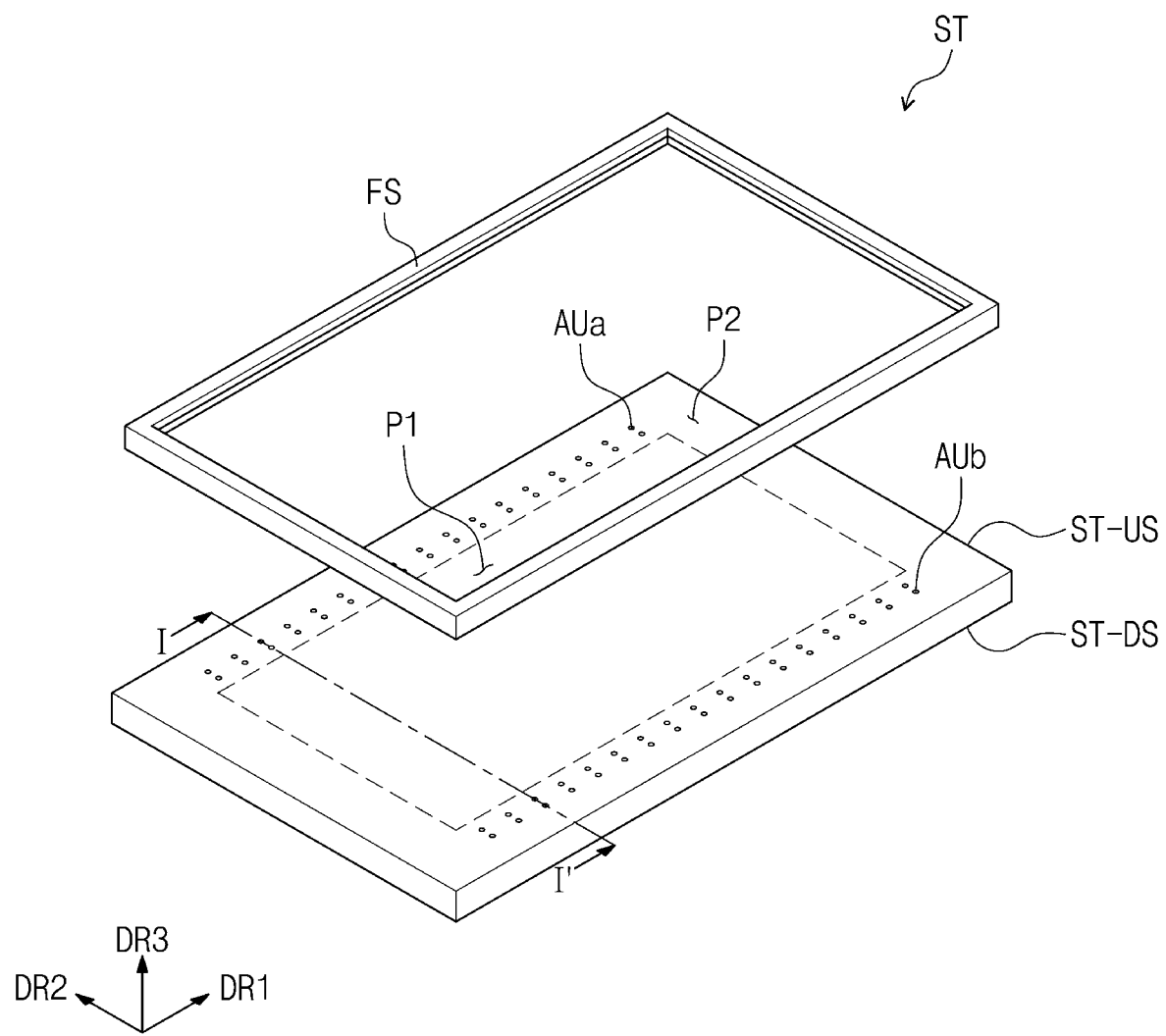
FIG. 6A is an exploded perspective view illustrating an embodiment of a stage of the bonding device in FIG. 5A.
Figure 6B:
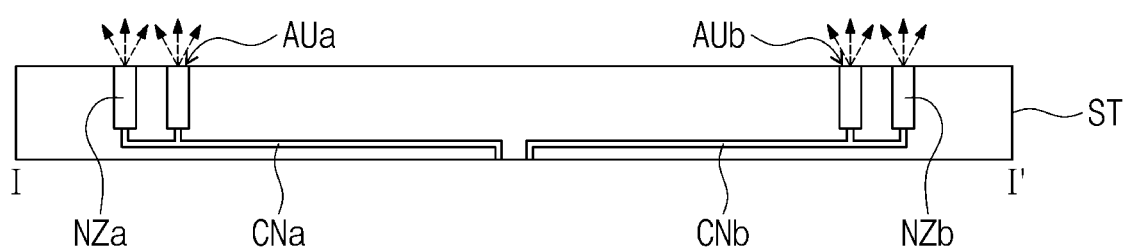
FIG. 6B is a cross-sectional view taken along line I-I' of FIG. 6A.

FIG. 6A is an exploded perspective view illustrating an embodiment of the stage ST of the bonding device LD in FIG. 5A. FIG. 6B is a cross-sectional view taken along line I-I' of FIG. 6A.

Referring to FIG. 6A, the stage ST includes a top surface ST-US and a bottom surface ST-DS. The top surface ST-US of the stage ST includes a first area P1 corresponding to the pad PD (refer to FIG. 3) and a second area P2 which is disposed adjacent to the first area P1. The second area P2 surrounds the first area P1 and has a planar area less than the first area P1.

One or more of a first stage opening AUa and a second stage opening AUb are defined in the second area P2, and the fixing member FS may be disposed on the second area P2. The fixing member FS coupled with the stage ST may dispose the fixing member FS in the second area P2 and surrounding each of the pad PD, the one or more of the first stage opening AUa and the one or more of the second stage opening AUb.

According to an embodiment, the one or more of the first stage opening AUa is spaced apart from the one or more of the second stage opening AUb, with the pad PD therebetween along the second direction DR2.

Referring to FIGS. 3 and 6B, a first nozzle NZa and a first pipe CNa which is connected to the first nozzle NZa may be connected to a first stage opening AUa. The first nozzle NZa may be disposed in a first stage opening AUa defined in the stage ST. A same one of the first pipe CNa may be commonly connected to more than one first nozzle NZa respectively disposed in a first stage opening AUa. The first pipe CNa may be connected to the support member MU. Air supplied from the support member MU may be transferred to the first nozzle NZa through the first pipe CNa.

Also, a second nozzle NZb and a second pipe CNb which is connected to the second nozzle NZb may be connected to a second stage opening AUb. The second nozzle NZb may be disposed in the second stage opening AUb defined in the stage ST. A same one of the second pipe CNb may be commonly connected to more than one second nozzle NZb respectively disposed in a second stage opening AUb. The second pipe CNb may be connected to the support member MU. The air supplied from the support member MU may be transferred to the second nozzle NZb through the second pipe CNb.

Although the first nozzle NZa and the first pipe CNa are described as different components, the two components may be integrated with each other. Likewise, although the second nozzle NZb and the second pipe CNb are described as different components, the two components may be integrated with each other.

According to an embodiment, each of the first nozzle NZa and the second nozzle NZb may be entirely inserted into the stage ST such that a top surface of each of the first nozzle NZa and the second nozzle NZb is coplanar with the top surface ST-US of the stage ST. However, the embodiment is not limited thereto. In an embodiment, for example, a portion of each of the first nozzle NZa and the second nozzle NZb may protrude from the top surface ST-US of the stage ST or may be entirely exposed outside the stage ST to spray air from the stage ST.

As previously described through FIG. 2A, the window member WM includes the window planar portion WM-P, and the first window bending portion WM-B1 and the second window bending portion WM-B2 which are each bent from the window planar portion WM-P, and through which images are seen from outside thereof, respectively.

The display module DM may generate and/or output an image to the window member WM and include the first display substrate bending portion DM-B1, the second display substrate bending portion DM-B2 and the display substrate planar portion DM-P respectively bonded to the first window bending portion WM-B1, the second window bending portion WM-B2 and the window planar portion WM-P, respectively.

Each of the display substrate planar portion DM-P of the display module DM and the window planar portion WM-P of the window member WM has a planar shape. As a result, bonding between the display substrate planar portion DM-P and the window planar portion WM-P may be easily performed. However, each of the first display substrate bending portion DM-B1 and the second display substrate bending portion DM-B2 of the display module DM and the first window bending portion WM-B1 and the second window bending portion WM-B2 of the window member WM, has a curved shape. As a result, respective bonding between the first display substrate bending portion DM-B1 and the second display substrate bending portion DM-B2, and the first window bending portion WM-B1 and the second window bending portion WM-B2 may generate a phenomenon of being biased to the display module DM or the window member WM may occur or particles may be undesirably generated.

According to an embodiment, the bonding device LD may bond the display substrate planar portion DM-P of the display module DM to the window planar portion WM-P of the window member WM by using the pad PD. Also, the bonding device LD may bond the first display substrate bending portion DM-B1 and the second display substrate bending portion DM-B2 of the display module DM to the first window bending portion WM-B1 and the second window bending portion WM-B2 of the window member WM by using the molding member PU, while the display substrate planar portion DM-P is pressed to or bonded to the window planar portion WM-P. Bonding between the first display substrate bending portion DM-B1 and the second display substrate bending portion DM-B2 and the first window bending portion WM-B1 and the second window bending portion WM-B2 may be more easily performed, and an overall defect generation rate of the display device may be reduced.

Figure 7:
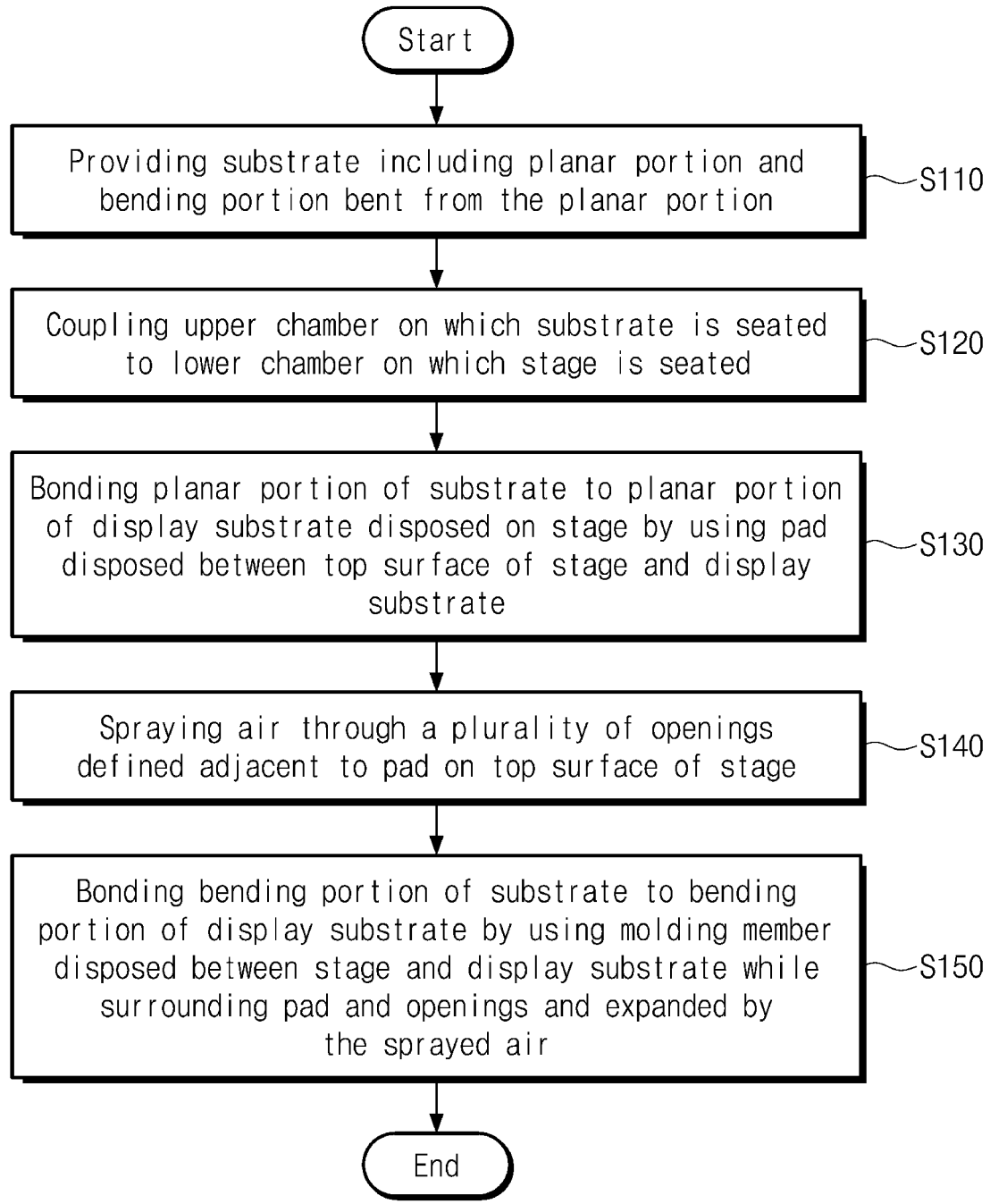
FIG. 7 is a flowchart illustrating an embodiment of a bonding method of a display device using a bonding device.

FIG. 7 is a flowchart illustrating an embodiment of a bonding method of a display device by using the bonding device. FIGS. 8A to 8D are cross-sectional views illustrating processes of an embodiment of a bonding method between the display module and the window member of a display device.

The bonding method explained through FIG. 7 may relate to a method of bonding a flexible substrate which is planar, to a substrate which has been molded to have a substrate planar portion and a substrate bending portion which is extended bent from the substrate planar portion. According to an embodiment, the window member WM corresponding to the substrate which has been molded to have the substrate planar portion and the substrate bending portion described above may be seated in the upper chamber UCB in advance as shown in the structure of FIG. 4. Hereinafter, a method of bonding the display module DM as the flexible substrate on the window member WM as the substrate which has been molded, by using the pad PD and the molding member PU, will be described.

As illustrated in FIGS. 8A to 8D, the window member WM is formed to include the window planar portion WM-P, the first window bending portion WM-B1, and the second window bending portion WM-B2 in FIG. 2A, and the display module DM is formed from the flexible substrate described above to include the display substrate planar portion DM-P, the first display substrate bending portion DM-B1, and the second display substrate bending portion DM-B2 in FIG. 2A. As shown in FIGS. 8A to 8D, the display module DM illustrated may represent a preliminary display module DM from which the display substrate planar portion DM-P, the first display substrate bending portion DM-B1, and the second display substrate bending portion DM-B2 will be formed.

Also, according to an embodiment, although the window member WM corresponds to the substrate which has been molded to have the substrate planar portion and the substrate bending portion described above, and the display module DM corresponds to the flexible substrate, the embodiment is not limited thereto. In an embodiment, for example, each of the window member WM and the display module DM may be substituted by various types of components of a display device, such as substrates and members other than a window member WM and a display module DM.

Although not shown in FIGS. 8A to 8D, the adhesive member AM in FIG. 2A may be disposed between the window member WM and the display module DM. The window member WM and the display module DM may be connected to each other through the adhesive member AM. That is, the substrate which has been molded to have the substrate planar portion and the substrate bending portion and the flexible substrate described above may be connected to each other through the adhesive member AM, by using one or more embodiment of the bonding device LD and/or the method of bonding portions of a display device to each other.

Figure 8A:
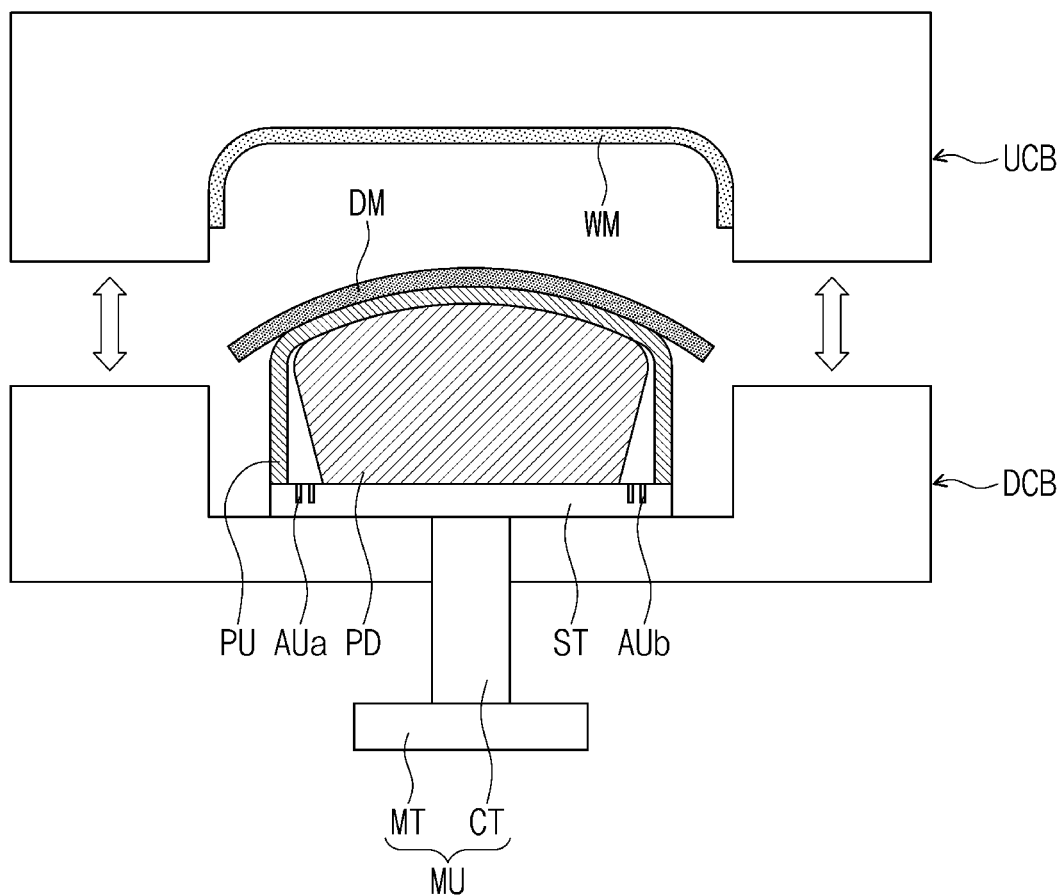
FIGS. 8A to 8D are cross-sectional views illustrating processes in an embodiment of a bonding method in which a display module and a window member of a display device are bonded to each other.

In detail, referring to FIGS. 7 and 8A, in a process S110, the window member WM including the window planar portion WM-P, and the first window bending portion WM-B1 and the second window bending portion WM-B2 each extended bent from the window planar portion WM-P is provided. The window member WM may be seated on the upper chamber UCB as shown in the structure of FIG. 4. The upper chamber UCB and the lower chamber DCB may be moved relative to each other, so as to decrease a distance therebetween, as shown by the arrows in FIG. 8A.

Figure 8B:
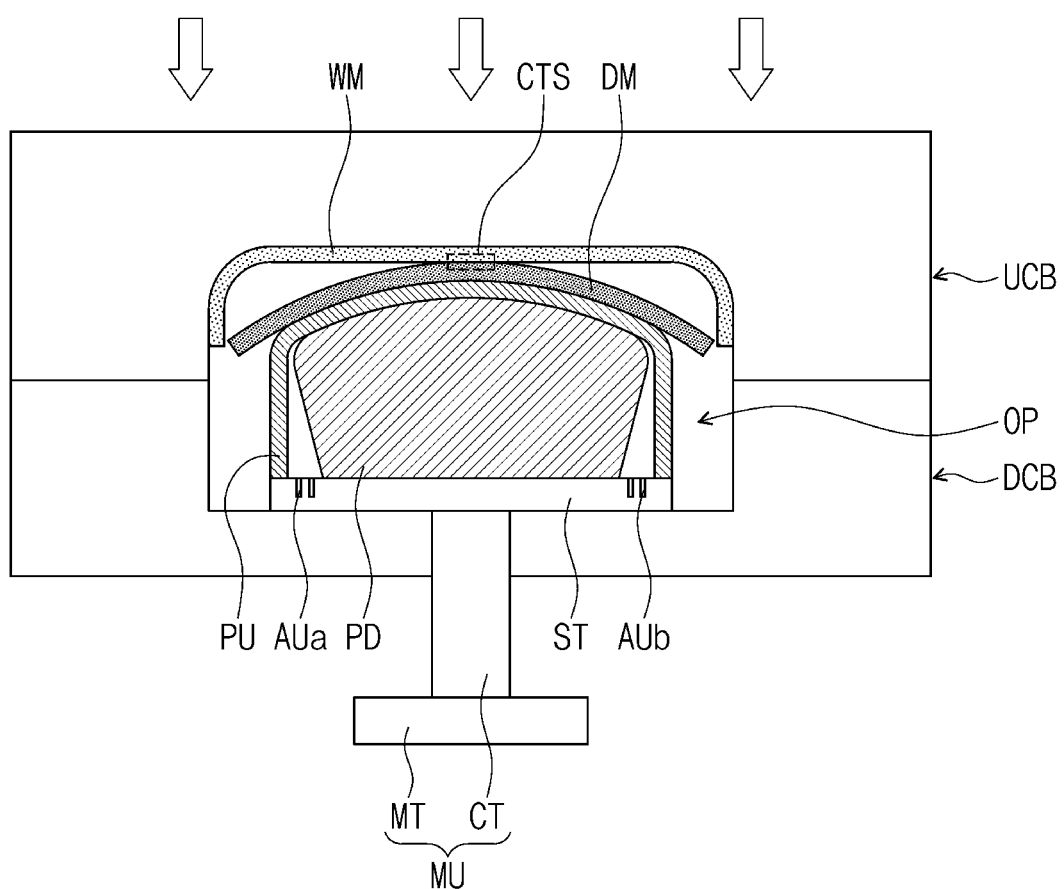

Referring to FIGS. 7 and 8B, in a process S120, the upper chamber UCB on which the window member WM is seated and the lower chamber DCB may be coupled or brought into contact with each other. As illustrated in FIG. 8B, although the upper chamber UCB may descend (shown by the downward arrows) to be coupled with the lower chamber DCB, the embodiment is not limited thereto. In an embodiment, for example, the lower chamber DCB may ascend to be coupled with the upper chamber UCB.

According to an embodiment, the upper chamber UCB and the lower chamber DCB coupled to each other defines the inner space OP between the upper chamber UCB and the lower chamber DCB. The stage ST, the pad PD, the molding member PU, the window member WM, and the display module DM may be disposed in the inner space OP. Also, while the upper chamber UCB and the lower chamber DCB are coupled to each other, the inner space OP may be maintained in a vacuum state. Although not shown, the bonding device LD may further include a member for forming the vacuum state of the inner space OP.

The coupling of the upper chamber UCB and the lower chamber DCB to each other may bond an initial portion of the display module DM disposed on the molding member PU to an initial portion of the window member WM. An area in which the initial portion of the preliminary form of the display module DM contacts the initial portion of the window member WM is described as a contact area CTS in FIG. 8B. The contact area CTS may be a reference area with which alignment between the preliminary form of the display module DM and the window member WM is determined. That is, the process S120 of coupling the upper chamber UCB and the lower chamber DCB to each other disposes the initial portion of the preliminary form of the display module DM supported by the pad PD to the initial portion of the window member WM, at the contact area CTS.

Figure 8C:
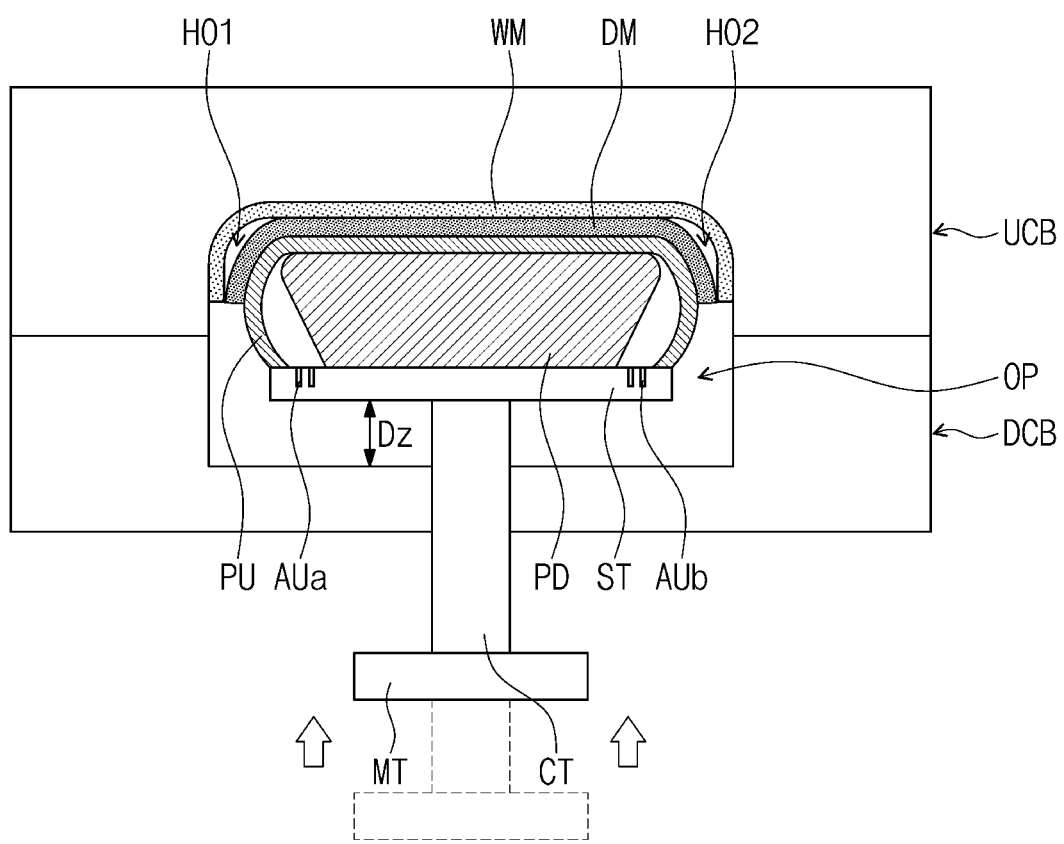

Referring to FIGS. 7 and 8C, the preliminary form of the display module DM which will be formed to include the display substrate planar portion DM-P, and the first display substrate bending portion DM-B1 and the second display substrate bending portion DM-B2 each extended bent from the display substrate planar portion DM-P in FIG. 2A, is disposed on the stage ST. In more detail, the preliminary form of the display module DM may be disposed on the molding member PU and supported by the pad PD.

In a process S130, an area of the preliminary form of the display module DM which will become the display substrate planar portion DM-P of the display module DM in FIG. 2A may be bonded to the window planar portion WM-P1 of the window member WM by using the pad PD disposed between the top surface of the stage ST and the display module DM.

In detail, the stage ST may ascend in along thickness direction, e.g., a normal direction, of the stage ST by using the support member MU connected to the bottom surface of the stage ST. The ascending of the stage ST is indicated by the distance Dz in FIG. 8C. The ascending of each of the transfer member CT and the control member MT of the support member MU simultaneously ascends the stage ST as shown by the upward arrows in FIG. 8C, however, the embodiment is not limited thereto. In an embodiment, for example, the ascending of the stage ST by using the support member MU connected to the stage ST may be performed through various methods.

The ascending of the stage ST also ascends the pad PD disposed on the stage ST. As previously described, the pad PD may include or be made of an elastic material. The ascending of the stage ST applies a force to the pad PD which contacts the molding member PU, and the force of the pad PD may be transmitted to the preliminary form of the display module DM through the molding member PU.

That is, the molding member PU overlapping the display substrate planar portion DM-P of preliminary form of the display module DM may press the display substrate planar portion DM-P through the pressed force of the pad PD. As an area of the preliminary form of the display module DM corresponding to the display substrate planar portion DM-P is continually pressed by using the pad PD, the entire area of the preliminary form corresponding to the display substrate planar portion DM-P may be bonded to the window planar portion WM-P of the window member WM to form the display substrate planar portion DM-P. Even where the entire area of the preliminary form corresponding to the display substrate planar portion DM-P is bonded to the window planar portion WM-P of the window member WM, a first gap H01 and a second gap H02 may remain between the window member WM and the preliminary form of the display module DM.

As described above, the display substrate planar portion DM-P of the display module DM is primarily bonded to the window planar portion WM-P of the window member WM starting at the contact area CTS in FIG. 8B. Actuation of the support member MU to press the preliminary form of the display module DM toward the window member WM, increases an area of contact between these two elements. Support of the display substrate planar portion DM-P of the display module DM by the pad PD reduces or effectively prevents movement between the display substrate planar portion DM-P of the preliminary form of the display module DM and the window planar portion WM-P of the window member WM.

Thereafter, under continued actuation of the support member MU, an entire area corresponding to the display substrate planar portion DM-P of the display module DM may be bonded to the window planar portion WM-P through the pressing of the pad PD described in FIG. 8C. Accordingly, when the display module DM and the window member WM are bonded to each other starting from the contact area CTS (FIG. 8B) and extending outwardly therefrom (FIG. 8C), a phenomenon of misalignment between the preliminary form of the display module DM and the window member WM may be reduced.

Figure 8D:
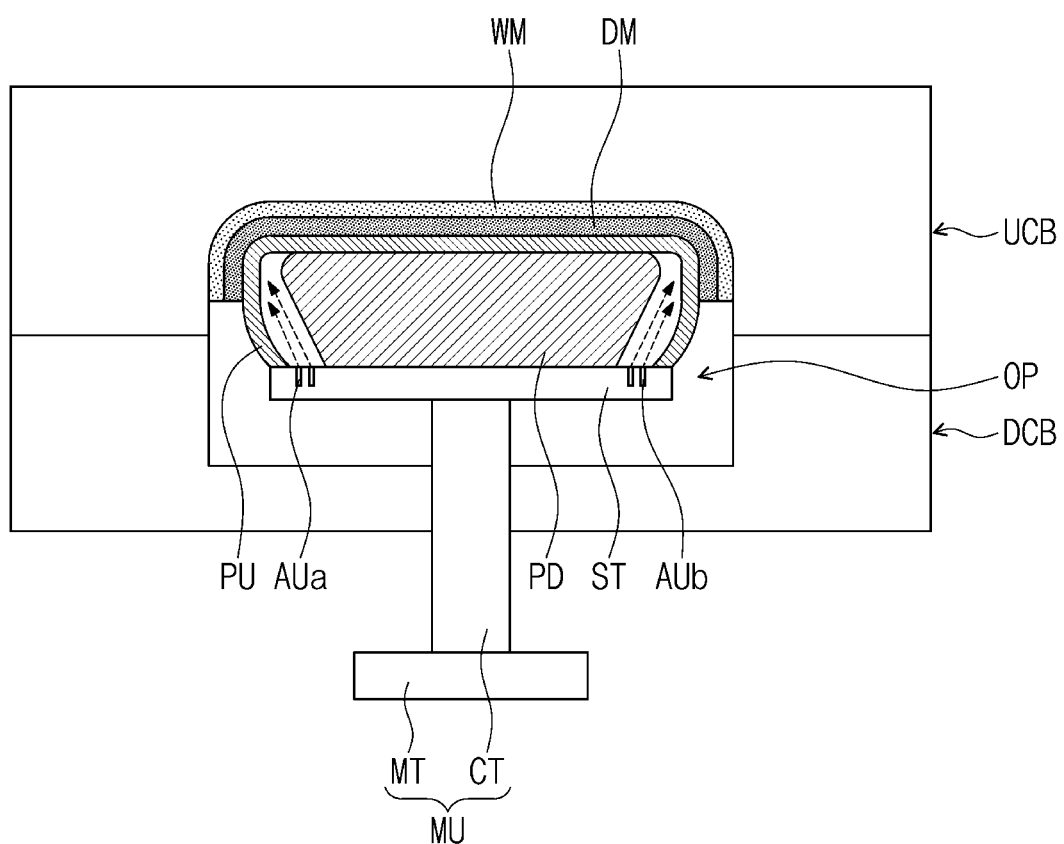

Referring to FIGS. 7 and 8D, in a process S140, air may be sprayed through the first stage opening AUa and the second stage opening AUb defined recessed from the top surface of the stage ST. According to an embodiment, air may be simultaneously injected into and from the first stage opening AUa and the second stage opening AUb. As a result, the air may be simultaneously sprayed through the first stage opening AUa and the second stage opening AUb and into the inner space OP.

Also, as previously described in FIG. 5A, the molding member PU may be fixed to the top surface of the stage ST while surrounding the pad PD, the first stage opening AUa, and the second stage opening AUb. That is, the inner space OP between the molding member PU and the stage ST may be sealed from outside each of the molding member PU and the stage ST. As a result, when the air is sprayed through the first stage opening AUa and the second stage opening AUb, the molding member PU may be expanded under pressure of the air within the inner space OP which is sealed.

In an embodiment, for example, the molding member PU may be expanded by the air sprayed from the first stage opening AUa. The expanding of the molding member PU may press an area of the preliminary form of the display module DM corresponding to the first display substrate bending portion DM-B1 of the display module DM in FIG. 2A. As a result, the area of the preliminary form of the display module DM corresponding to the first display substrate bending portion DM-B1 may be bonded to the first window bending portion WM-B1 of the window member WM. That is, the bonding of the area of the preliminary form of the display module DM corresponding to the first display substrate bending portion DM-B1, to the first window bending portion WM-B1 of the window member WM, essentially eliminates the first gap H01.

In an embodiment, for example, the molding member PU may be expanded by the air sprayed from the second stage opening AUb. The expanding of the molding member PU may press an area of the preliminary form of the display module DM corresponding to the second display substrate bending portion DM-B2 of the display module DM. As a result, area of the preliminary form of the display module DM corresponding to the second display substrate bending portion DM-B2 of the display module DM may be bonded to the second window bending portion WM-B2 of the window member WM. That is, the bonding of the area of the preliminary form of the display module DM corresponding to the second display substrate bending portion DM-B2, to the second window bending portion WM-B2 of the window member WM, essentially eliminates the second gap H02.

According to an embodiment, the expansion of the molding member PU is expanded simultaneously bonds areas corresponding to the first display substrate bending portion DM-B1 and the second display substrate bending portion DM-B2 of the display module DM, to the first window bending portion WM-B1 and the second window bending portion WM-B2 of the window member WM, respectively.

As described above, one or more embodiment of the bonding device LD may primarily bond the window member WM to an initial area of a preliminary form of the display module DM through the pad PD, and secondarily bond the window member WM to other areas of the preliminary form of the display module DM which extend from the initial area, by the expanding and pressing of the molding member PU by air to the window member WM. The secondary bond may be performed while the window member WM is contacted to or bonded to the initial area of the preliminary form of the display module DM through the pad PD.

According to one or more embodiment, although the bonding device LD is used for a bonding method between two flexible substrates which will be formed to include a planar portion and a bending portion, the invention is not limited thereto. In an embodiment, for example, one or more embodiment of the bonding device LD may be used for a bonding method between two flexible substrates each including only a planar portion. In an embodiment, for example, as the molding member PU is fixed on the stage ST while surrounding the pad PD, when two flexible substrates including only a planar portion are bonded by using the pad PD, abrasion of the pad PD may progress relatively slowly by the molding member PU.

Figure 9:
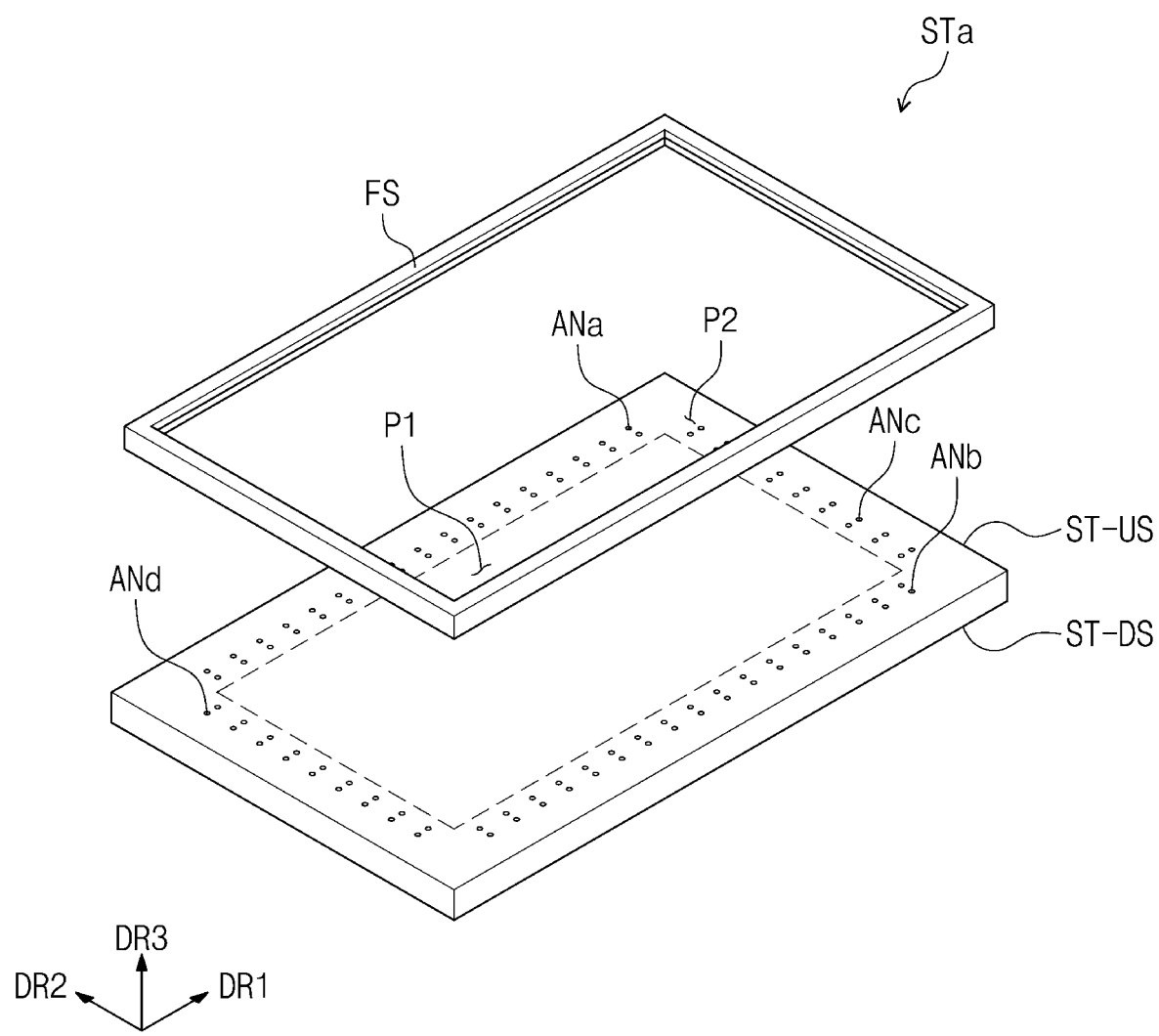
FIG. 9 is an exploded perspective view illustrating a modified embodiment of a stage of the bonding device in FIG. 5A.

FIG. 9 is an exploded perspective view illustrating a modified embodiment of the stage in FIG. 5A.

Referring to FIG. 9, a top surface ST-US of a stage STa includes a first area P1 corresponding to the pad PD (refer to FIG. 3) and a second area P2 which surrounds the first area P1.

One or more of a first stage opening ANa and one or more of a second stage opening ANb may be defined in the second area P2 in FIG. 9, and may be substantially the same as the first stage opening AUa and the second stage opening AUb in FIG. 5A, respectively.

According to an embodiment, the stage STa further includes one or more of a third stage opening ANc and one or more of a fourth stage opening ANd defined in the second area P2. The third stage opening ANc and the fourth stage opening ANd may be spaced apart from each other with the pad PD therebetween along the first direction DR1.

The stage STa in FIG. 9 may be used for the bonding method of the display device DDb and the display device DDc described in FIGS. 1C and 1D. The window member WM within the bonding method described at FIGS. 7 to 8D, may further include a third window bending portion and a fourth window bending portion, which are each extended bent from the window planar portion WM-P along the first direction DR1 to face each other along the first direction DR1.

As previously described in FIG. 1C, the first window bending portion WM-B1 of the window member WM corresponds to the first display area DD-DA2a. The second window bending portion WM-B2 of the window member WM corresponds to the second display area DD-DA2b. The third window bending portion of the window member WM corresponds to the third display area DD-DA2c. The fourth window bending portion of the window member WM corresponds to the fourth display area DD-DA2d. Also, the first display substrate bending portion DM-B1 of the display module DM corresponds to the first display area DD-DA2a. The second display substrate bending portion DM-B2 of the display module DM corresponds to the second display area DD-DA2b. The third display substrate bending portion of the display module DM corresponds to the third display area DD-DA2c. The fourth display substrate bending portion of the display module DM corresponds to the fourth display area DD-DA2d.

In an embodiment, for example, the molding member PU may be expanded by the air sprayed from the third stage opening ANc, and the molding member PU may press the third display substrate bending portion of the display module DM. As a result, an area of the preliminary form of the display module DM corresponding to the third display substrate bending portion of the display module DM may be bonded to the third window bending portion of the window member WM.

In an embodiment, for example, the molding member PU may be expanded by the air sprayed from the fourth stage opening ANd, and the molding member PU may press an area of the preliminary form of the display module DM corresponding to the fourth display substrate bending portion of the display module DM. As a result, the fourth display substrate bending portion of the display module DM may be bonded to the fourth window bending portion of the window member WM.

According to one or more embodiment, a planar area of the window member and a planar area of the display module corresponding to the planar area of the window member, may be firstly bonded to each other. Then a bending area of the window member and a bending area of the display module corresponding to the bending area of the window member may be bonded to each other by the molding member expanded by air.

Thus, reliability of the bonding between the window member and the display module may increase.

Hereinabove, the embodiments are disclosed in the drawings and the specification. While specific terms were used, they were not used to limit the meaning or the scope of the invention described in claims, but merely used to explain the invention. Accordingly, a person having ordinary skill in the art will understand from the above that various modifications and other equivalent embodiments are also possible. Hence, the real protective scope of the invention shall be determined by the technical scope of the accompanying claims.

What is claimed is:

1. A method of bonding a display device, the method comprising:
   providing a substrate of the display device, the substrate comprising a planar portion and a bending portion which is bent from the planar portion;
   providing a display substrate of the display device, on a stage of a bonding device, the providing the display substrate disposing a pad of the bonding device between the stage and the display substrate;
   pressing the pad of the bonding device to the display substrate to bond a first portion of the display substrate to the planar portion of the substrate;
   while the pad is pressed to the display substrate, providing air through a stage opening defined in the stage and disposed adjacent to the pad, to expand a molding member of the bonding device which surrounds the pad and is between the pad and the display substrate; and
   pressing the molding member which is expanded, to the display substrate, to bond a second portion of the display substrate adjacent to the first portion thereof, to the bending portion of the substrate.

2. The method of claim 1, wherein
   the stage opening is provided in plural and comprises a first stage opening and a second stage opening each open at a top surface of the stage, and
   the first stage opening and the second stage opening are spaced apart from each other with the pad therebetween along a first direction.

3. The method of claim 2, wherein
   the bending portion of the substrate comprises a first bending portion and a second bending portion which face each other along the first direction, and
   the second portion of the display substrate comprises a first display substrate bending portion bonded to the first bending portion and a second display substrate bending portion bonded to the second bending portion.

4. The method of claim 3, wherein the bonding of the second portion of the display substrate to the bending portion of the substrate comprises:
   pressing the first display substrate bending portion to the first bending portion, by the molding member expanded by air provided from the first stage opening; and
   pressing the second display substrate bending portion to the second bending portion, by the molding member expanded by air provided from the second stage opening.

5. The method of claim 3, wherein the stage opening provided in plural further comprises a third stage opening and a fourth stage opening, each open at the top surface of the stage, and
   the third stage opening and the fourth stage opening are spaced apart from each other with the pad therebetween along a second direction crossing the first direction.

6. The method of claim 5, wherein
   the bending portion of the substrate further comprises a third bending portion and a fourth bending portion which face each other along the second direction, and
   the second portion of the display substrate further comprises:
   a third display substrate bending portion bonded to the third bending portion, by pressing of the third display substrate bending portion to the third bending portion by the molding member expanded by the air provided from the third stage opening; and
   a fourth display substrate bending portion bonded to the fourth bending portion, by pressing of the fourth display substrate bending portion to the fourth bending portion by the molding member expanded by the air provided from the fourth stage opening.

7. The method of claim 2, wherein the bonding of the first portion of the display substrate to the planar portion of the substrate comprises:
   moving the stage toward the substrate comprising the planar portion and the bending portion, along a thickness direction of the stage, by actuating a support member of the bonding device which is connected to the stage; and the actuating of the support member moving the pad and the molding member together with the stage to press the first portion of the display substrate to the planar portion of the substrate.

8. The method of claim 7, further comprising injecting the air into the first stage opening and the second stage opening, through the support member of the bonding device.

9. The method of claim 8, wherein the air is simultaneously injected into each of the first stage opening and the second stage opening, through the support member.

10. The method of claim 1, wherein the providing the substrate comprising the planar portion and the bending portion comprises providing the substrate in an upper chamber of the bonding device, and the stage of the bonding device is disposed in a lower chamber of the bonding device which faces the upper chamber, further comprising coupling the upper chamber having the substrate therein, and the lower chamber having the display substrate disposed on the stage, to each other.

* * * * *